United States Patent
Huberman et al.

(10) Patent No.: US 11,424,835 B2
(45) Date of Patent: Aug. 23, 2022

(54) QUANTUM INTERNET ROUTER

(71) Applicant: CABLE TELEVISION LABORATORIES, INC., Louisville, CO (US)

(72) Inventors: Bernardo Huberman, Palo Alto, CA (US); Robert M. Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 9 days.

(21) Appl. No.: 16/776,265

(22) Filed: Jan. 29, 2020

(65) Prior Publication Data

US 2020/0244373 A1 Jul. 30, 2020

Related U.S. Application Data

(60) Provisional application No. 62/798,620, filed on Jan. 30, 2019.

(51) Int. Cl.
*H04B 10/70* (2013.01)
*H04Q 11/00* (2006.01)

(52) U.S. Cl.
CPC ......... *H04B 10/70* (2013.01); *H04Q 11/0005* (2013.01); *H04Q 11/0062* (2013.01); *H04Q 2011/0073* (2013.01)

(58) Field of Classification Search
CPC ............... H04B 10/70; H04Q 11/0005; H04Q 2011/0073; H04Q 11/0062; G06N 10/00
USPC .................................................. 398/43–103
See application file for complete search history.

(56) References Cited

U.S. PATENT DOCUMENTS

| | | | |
|---|---|---|---|
| 9,264,225 B1 * | 2/2016 | Hunt ..................... | H04L 9/0852 |
| 2006/0249670 A1 * | 11/2006 | Monroe ................. | G06N 10/00 250/283 |
| 2007/0223698 A1 * | 9/2007 | Tsurumaru ............ | H04L 9/0858 380/256 |
| 2008/0089696 A1 * | 4/2008 | Furuta ................... | H04L 9/0855 398/175 |

(Continued)

OTHER PUBLICATIONS

Guang et al, A Relay Strategy for Noisy Quantum Ad Hoc Network, Apr. 2015, ICT-2015, All Document. (Year: 2015).*

(Continued)

*Primary Examiner* — Dibson J Sanchez
(74) *Attorney, Agent, or Firm* — Lathrop GPM LLP

(57) ABSTRACT

Methods, systems, and devices for a quantum Internet router are described. A first network node (e.g., a quantum Internet router) may receive a command from a second network node by a digital information channel indicating a destination network node, a Bell State Measurement (BSM), and a pair of entangled particles establishing a quantum entangled channel between the first and second network nodes. The first network node may determine a third network node to forward the command based on a forwarding table and generate a second BSM based on a QSR operation and a second pair of entangled particles establishing a quantum entangled channel between the first and third network nodes. The first network node may forward, to the third network node, a command indicating the destination network node, the second BSM, and the second pair of entangled particles.

20 Claims, 5 Drawing Sheets

(56) References Cited

U.S. PATENT DOCUMENTS

| | | | | |
|---|---|---|---|---|
| 2009/0097862 A1* | 4/2009 | Munro | ................. | H04L 9/0855 |
| | | | | 398/175 |
| 2009/0317089 A1* | 12/2009 | Peters | ................... | H04L 9/0855 |
| | | | | 398/173 |
| 2012/0148237 A1* | 6/2012 | Harrison | ................ | B82Y 10/00 |
| | | | | 398/180 |
| 2014/0363174 A1* | 12/2014 | Azuma | ................ | H04L 9/0855 |
| | | | | 398/173 |
| 2020/0412444 A1* | 12/2020 | Jiang | ..................... | H04B 10/70 |

OTHER PUBLICATIONS

Wang et al, Quantum secure direct communication network, Aug. 2013, IEEE-NANO 2013, All Document. (Year: 2013).*

Xiaofei et al, Ad hoc quantum network routing protocol based on quantum teleportation, Oct. 2013, Proceedings of the International Symposium on Antennas & Propagation. All Document. (Year: 2013).*

Meter et al, Path Selection for Quantum Repeater Networks, Jun. 2012, Cornell University, Quantum Physics, All Document. (Year: 2012).*

Jiang et al, Quantum Network Routing Algorithm Based on Trusted Center, 2018, JOC, vol. 29 No. 2, All Document. (Year: 2018).*

Schoute et al, Shortcuts to quantum network routing, Oct. 2016, arXiv:1610.05238v1, All Document. (Year: 2016).*

* cited by examiner

QUANTUM INTERNET ROUTER

RELATED APPLICATIONS

This present application for patent claims the benefit of U.S. Provisional Patent Application No. 62/798,620 by Huberman et al., entitled "QUANTUM INTERNET ROUTER," filed Jan. 30, 2019, assigned to the assignee hereof, and expressly incorporated by reference herein in its entirety.

BACKGROUND

The field of the disclosure relates to Internet communications, and more specifically to a quantum Internet router.

Traditional Internet communications include a network of nodes (e.g., network nodes, Internet routers). The network nodes may receive and forward digital data based on routing information associated with the digital data. These network nodes may be coupled with each other by classic channels such as a digital information channel. The channels may be formed by a communication line (e.g., coaxial cable, fiber-optic cable). Digital information channels may suffer from security and processing limitations. In contrast, quantum computers and quantum communications may provide enhanced processing capability and security, but have inherent limits of transmission mediums (e.g., optical signals) due to attenuation.

SUMMARY

The described techniques relate to improved methods, systems, devices, or apparatuses that support a quantum Internet router. Generally, the described techniques provide for a router within a network of nodes that is configured to route and transport a quantum state (e.g., a qubit) of a particle. That is, a qubit may be transported from a source network node to a destination network node by one or more distributed network nodes (e.g., quantum Internet routers). A network node configured to transport qubits may be coupled with one or more other network nodes by classic channels (e.g., a digital information channel) and one or more quantum entangled channels (e.g., established using entangled particle (EP) pairs). The network node (e.g., a first network node) may receive a command from a second network node via the digital information channel. The command may include an indication of the destination network node, a Bell State Measurement (BSM), and an identifier of EPs corresponding to a quantum entangled channel. The first network node may perform a quantum state recovery (QSR) operation using the BSM and the identified EPs to determine the qubit being transported to the destination network node. Additionally, the first network node may reference a forwarding table (e.g., stored in memory at the first network node) to determine a network node for forwarding of the command (e.g., a third network node). Based on the determined third network node, the first network node may select an EP associated with a quantum entangled channel between the first network node and the third network node. Using the selected EP and the qubit, the first network node may generate a second BSM. The first network node may transmit a command to the third network node by a digital information channel, the command including the indication of the destination network node, the second BSM, and an identifier of the EPs used to generate the second BSM. Each of the network nodes of the distributed network nodes may perform similar operations until the destination network node receives the command and recovers the quantum state of the qubit for processing.

A method at a first network node is described. The method may include receiving, from a second network node via a first digital information channel, a first command indicating a destination network node and a first BSM associated with a first entangled particle of a first pair of EPs that establish a first quantum entangled channel between the first network node and the second network node, and selecting, based on the destination network node, a third network node from a set of network nodes, where the first network node includes one or more EPs each associated with respective ones of one or more pairs of EPs that establish respective quantum entangled channels between the first network node and each network node of the set of network nodes. The method may further include generating a second BSM based on the first BSM and the first entangled particle and associated with a second entangled particle of a second pair of EPs of the one or more pairs of EPs that establishes a second quantum entangled channel between the first network node and the third network node, and transmitting, to the third network node by a second digital information channel, a second command indicating the destination network node and the second BSM.

A first network node is described. The first network node may include a processor, memory in electronic communication with the processor, and instructions stored in the memory. The instructions may be executable by the processor to cause the first network node to receive, from a second network node via a first digital information channel, a first command indicating a destination network node and a first BSM associated with a first entangled particle of a first pair of EPs that establish a first quantum entangled channel between the first network node and the second network node, and select, based on the destination network node, a third network node from a set of network nodes, where the first network node includes one or more EPs each associated with respective ones of one or more pairs of EPs that establish respective quantum entangled channels between the first network node and each network node of the set of network nodes. The instructions may be further executable by the processor to cause the first network node to generate a second BSM based on the first BSM and the first entangled particle and associated with a second entangled particle of a second pair of EPs of the one or more pairs of EPs that establishes a second quantum entangled channel between the first network node and the third network node, and transmit, to the third network node by a second digital information channel, a second command indicating the destination network node and the second BSM.

Another first network node is described. The first network node may include means for receiving, from a second network node via a first digital information channel, a first command indicating a destination network node and a first BSM associated with a first entangled particle of a first pair of EPs that establish a first quantum entangled channel between the first network node and the second network node, and means for selecting, based on the destination network node, a third network node from a set of network nodes, where the first network node includes one or more EPs each associated with respective ones of one or more pairs of EPs that establish respective quantum entangled channels between the first network node and each network node of the set of network nodes. The first network node may further include means for generating a second BSM based on the first BSM and the first entangled particle and associated with a second entangled particle of a second pair of EPs of the one or more pairs of EPs that establishes a second quantum entangled channel between the first network node and the third network node, and means for transmitting, to the third network node by a second digital information channel, a second command indicating the destination network node and the second BSM.

A non-transitory computer-readable medium storing code at a first network node is described. The code may include instructions executable by a processor to receive, from a second network node via a first digital information channel, a first command indicating a destination network node and a first BSM associated with a first entangled particle of a first pair of EPs that establish a first quantum entangled channel between the first network node and the second network node, and select, based on the destination network node, a third network node from a set of network nodes, where the first network node includes one or more EPs each associated with respective ones of one or more pairs of EPs that establish respective quantum entangled channels between the first network node and each network node of the set of network nodes. The code may further include instructions by the processor to generate a second BSM based on the first BSM and the first entangled particle and associated with a second entangled particle of a second pair of EPs of the one or more pairs of EPs that establishes a second quantum entangled channel between the first network node and the third network node, and transmit, to the third network node by a second digital information channel, a second command indicating the destination network node and the second BSM.

Some examples of the method, apparatuses, and non-transitory computer-readable medium described herein may further include operations, features, means, or instructions for performing, based on the first BSM and the first pair of EPs, a QSR operation to determine a quantum state of a source particle associated with the first command, where generating the second BSM may be based on the quantum state of the source particle associated with the first command.

Some cases of the method, apparatuses, and non-transitory computer-readable medium described herein may further include operations, features, means, or instructions for receiving, from a control node, more than one entangled particle each associated with a respective pair of EPs that establishes a quantum entangled channel between the first network node and the second network node, where the more than one entangled particle includes the first entangled particle.

Some instances of the method, apparatuses, and non-transitory computer-readable medium described herein may further include operations, features, means, or instructions for receiving, from the control node, a set of identifiers identifying the respective pairs of EPs, where the first command further includes a first identifier of the set of identifiers identifying the first pair of EPs.

Some examples of the method, apparatuses, and non-transitory computer-readable medium described herein may further include operations, features, means, or instructions for transmitting, to a control node, an indication of receiving the first command indicating the first BSM associated with the first pair of EPs that establish the first quantum entangled channel between the first network node and the second network node, and receiving, from the control node, a third entangled particle associated with a third pair of EPs that establishes a third entangled channel between the first network node and the second network node.

Some cases of the method, apparatuses, and non-transitory computer-readable medium described herein may further include operations, features, means, or instructions for receiving the first command indicating the first BSM associated with the first pair of EPs that establish the first quantum entangled channel between the first network node and the second network node decreases a quantity of quantum entangled channels between the first network node and the second network node by one, and transmitting the indication may be based on the quantity of quantum entangled channels between the first network node and the second network node being less than a threshold quantity of entangled channels between the first network node and the second network node based on decreasing the quantity of quantum entangled channels between the first network node and the second network node by one.

In some instances of the method, apparatuses, and non-transitory computer-readable medium described herein, the selecting the third network node further includes referencing a forwarding table, where the forwarding table indicates the third network node based on the destination network node.

In some examples of the method, apparatuses, and non-transitory computer-readable medium described herein, the first command further indicates an identifier of the first pair of EPs, and the second command further indicates an identifier of the second pair of EPs.

Some cases of the method, apparatuses, and non-transitory computer-readable medium described herein may further include operations, features, means, or instructions for receiving, from a fourth network node of the set of network nodes different than the second network node, a third command indicating a second destination network node and a third BSM associated with a third pair of EPs of the one or more pairs of EPs that establish a third quantum entangled channel between the first network node and the fourth network node.

In some instances of the method, apparatuses, and non-transitory computer-readable medium described herein, the first network node may be different than the destination network node, and selecting the third network node may be based on the first network node being different than the destination network node.

An apparatus is described. The apparatus may include a set of quantum entangled channel interfaces each configured to receive one EP of a pair of EPs to link the apparatus and one of a set of network nodes, a set of digital information channel interfaces each configured to receive a set of commands from one of the set of network nodes, where each command of the set of commands indicates a destination network node and a first BSM associated with one quantum entangled channel interface of the set of quantum entangled channel interfaces, and memory configured to store a forwarding table indicating to which of the set of network nodes to forward commands of the set of commands based on the destination network node, where the forwarded commands include a second BSM based on the first BSM.

Some examples of the apparatus may include circuitry configured to perform a QSR operation to determine a quantum state of a source particle associated with each of the set of commands based on the first BSM and the one EP received by the one quantum entangled channel interface.

In some cases, the set of quantum entangled channel interfaces includes more than one quantum entangled channel interface associated with each of the set of network nodes.

In some instances, each of the set of digital information channel interfaces may be further configured to transmit the forwarded commands to one of the set of network nodes indicated by the forwarding table.

In some examples, each of the set of commands includes a first identifier of a first pair of EPs including an EP received by the one quantum entangled channel interface associated with the first BSM, and each of the forwarded commands includes a second identifier of a pair of a second pair of EPs to link the apparatus and a network node of the set of network nodes indicated by the forwarding table.

DETAILED DESCRIPTION

Figure 1:
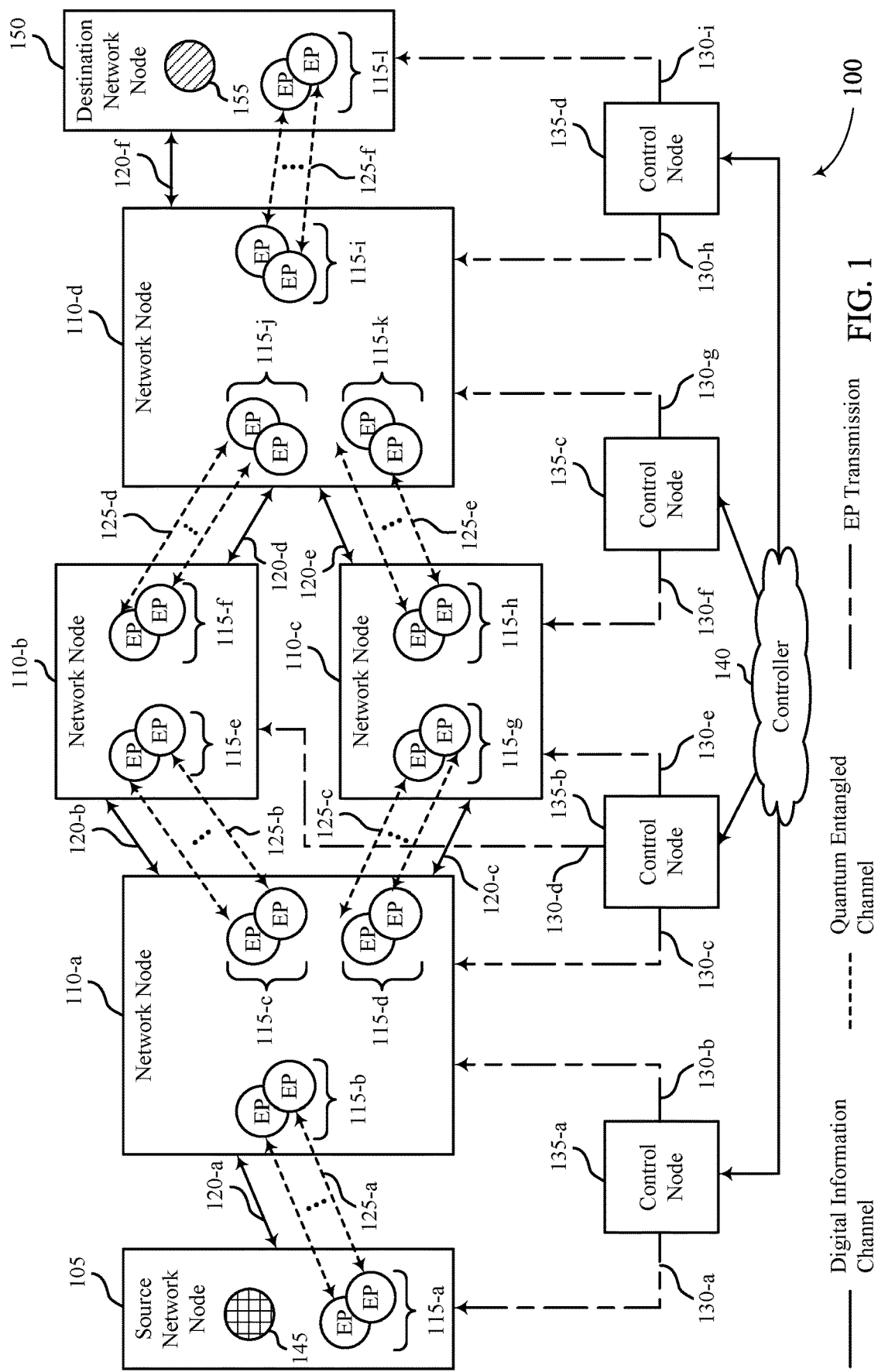
FIG. 1 illustrates an example of a system that supports a quantum Internet router in accordance with aspects of the present disclosure.

In some Internet communication systems, network nodes are configured to communicate digital information (e.g., bits) by classic channels (e.g., digital information channels such as Ethernet channels, Asynchronous Transfer Mode channels) between a network of nodes. Digital information channels may be carried over electrical cables (e.g., twisted pair such as Cat 5e cable or Cat 6 cable) or fiber optic cables. In some cases, it may be desirable for these nodes to communicate quantum information (e.g., qubits). But transmission of an instance of a quantum photon may be limited due to attenuation of the optical signal. Additionally, the instance of the quantum photon may not be cloned or amplified to extend a possible transmission distance of the instance of the quantum photon. Instead, the network nodes may utilize a quantum teleportation protocol to transfer a quantum state between network nodes. Here, the quantum state of a particle (e.g., a photon) may be transferred from a first photon to a second photon by entangled particles (EPs). In principle, this may enable network nodes transmit a quantum state of a particle along a chain of EP links (e.g., quantum entangled channels). Thus, the network nodes may be enabled to receive and route quantum states based on a destination network node.

Generally, the described techniques provide for an Internet router within a network of nodes that is configured to transport a quantum state of a particle to one of multiple other nodes. A network node configured to transport qubits may be coupled with one or more other network nodes by classic channels (e.g., a digital information channel) and one or more quantum entangled channels (e.g., established using EP pairs). The network node (e.g., a first network node) may receive a command from a second network node by the digital information channel. The command may include an indication of the destination network node, a Bell State Measurement (BSM), and an identifier of EPs corresponding to a quantum entangled channel. The first network node may perform a quantum state recovery (QSR) operation using the BSM and the identified EPs to determine the qubit being transported to the destination network node. Additionally, the first network node may reference a forwarding table (e.g., stored in memory at the first network node) to determine a network node to forward the command to (e.g., a third network node). Based on the determined third network node, the first network node may select an EP associated with a quantum entangled channel between the first network node and the third network node. Using the selected EP and the qubit, the first network node may generate a second BSM. The first network node may transmit a command to the third network node by a digital information channel, the command including the indication of the destination network node, the second BSM, and an identifier of the EPs used to generate the second BSM. Each of the network nodes of the distributed network nodes may perform similar operations until the destination network node receives the command.

Aspects of the disclosure are initially described in the context of a system. Aspects of the disclosure are further described in the context of a network node and a process flow. Aspects of the disclosure are further illustrated by and described with reference to block diagrams and a flowchart that relate to a quantum Internet router.

FIG. 1 illustrates an example of a system 100 that supports a quantum Internet router in accordance with various aspects of the present disclosure. The system 100 may be an example of an Internet communications system 100 configured to communicate digital information (e.g., bits) and quantum state information (e.g., qubits). The system 100 includes a source network node 105, network nodes 110, and a destination network node 150. Each of the network nodes 105, 110, and 150 may be in communication with one or more other network nodes 105, 110, or 150 by a digital information channel 120 and at least one quantum entangled channel 125. The network nodes 105, 110, and 150 may also be in communication with one or more control nodes 135 configured to communicate EP transmissions 130 to the network nodes 105, 110, and 150.

Each of the quantum entangled channels 125 may be configured by a control node 135 (e.g., an EP creation node). A control node 135 may generate a pair of EPs 115 and transmit each of the pair of EPs 115 to different ones of two network nodes 105, 110, or 150. For example, the control node 135-*a* may generate a pair of EPs 115 and transmit a first EP 115 of the pair of EPs 115 to the source network node 105 by the EP transmission 130-*a*. Additionally, the control node 135-*a* may transmit a second EP 115 of the pair of EPs 115 to the network node 110-*a* by the EP transmission 130-*b*. The control node 135 may additionally transmit an identifier of the pair of EPs 115 to both of the network nodes receiving the pair of EPs. Thus, the control node 135-*a* may configure a quantum entangled channel 125 between the source network node 105 and the network node 110-*a* associated with the identifier of the pair of EPs 115. In some cases, the control nodes 135 may configure more than one quantum entangled channel 125 between network nodes 105, 110, or 150. For example, the control node 135-*b* may configure multiple quantum entangled channels (e.g., two, three, four) between network node 110-*a* and 110-*b* (e.g., by generating EP pairs and transmitting EPs 115 to the network nodes 110-*a* and 110-*b* by EP transmissions 130-*c* and 130-*d*, respectively).

The controller 140 may issue commands to the control nodes 135 to generate additional pairs of EPs 115. For example, when a quantum entangled channel 125 is used by a network node 105, 110, or 150, that quantum entangled channel 125 may be extinguished because the wave functions of the associated EPs are collapsed by measurement. To ensure that the network nodes 105, 110, and 150 maintain quantum entangled channel communications, the controller 140 may issue a command to one of the control nodes 135 to create a pair of EPs 115 and communicate them to two network nodes 105, 110, or 150. In some cases, the controller 140 may receive an indication when a quantum entangled channel 125 is used. Based on the indication, the controller 140 may determine whether an additional pair of EPs is to be generated by a control node 135. For example, if a quantity of quantum entangled channels between two network nodes 105, 110, or 150 falls below a threshold (e.g., two quantum entangled channels), the controller 140 may issue a command to a control node 135 to generate an additional pair of EPs 115 to establish a new quantum entangled channel 125 between the two network nodes 105, 110, or 150. For example, if the network node 110-b uses a quantum entangled channel 125-d to communicate a quantum state of a particle to the network node 110-d, the network node 110-b or network node 110-d may indicate the use of the quantum entangled channel 125-d to the controller 140. The controller 140 may issue a command to the control node 135-c to generate a pair of EPs 115. The control node 135-c may generate the pair of EPs 115 and communicate a first EP 115 to the network node 110-b and a second EP 115 of the pair of EPs 115 to the network node 110-d, establishing an additional quantum entangled channel 125-d between the two network nodes 110-b and 110-d.

The source network node 105 may determine a source particle 145 for transmission to a destination network node 150. In some cases, the source network node 105 may be unable to transmit the source particle 145 directly to the destination network node 150. For example, a distance between the source network node 105 and the destination network node 150 may be greater than a distance that a quantum photon may be transmitted without significant amounts of attenuation. Instead, the source network node 105 may determine to transmit the quantum state of the source particle (e.g., a qubit indicating the quantum state of the source particle 145) to the destination network node 105 by a series of quantum entangled channels 125 and network nodes 110.

To communicate the quantum state of the source particle 145 to network node 110-a, the source network node 105 may perform a BSM operation with the source particle 145 and one of the EPs 115-a. Thus, the source network node 105 may cause the source particle 145 and the EP 115-a to collapse into a classical state (e.g., the source particle and the EP 115-a may no longer be quantum particles). The source network node 105 may transmit, by the digital information channel 120-a, the BSM result to network node 110-a. For example, the source network node 105 may transmit a command by the digital information channel 120-a including the BSM result. The command may further include an indication of the destination network node 150 and an identifier or the EP 115-a used to determine the BSM result. An example command may be QTP://QIR1?src='Source'&Dest='Dest'&BSM= . . . &epid=1. Here, the command may include an indication of the next network node 110-a (e.g., the network node 110 for the next hop, QIR1) source network node 105 (e.g., Source), an indication of the destination network node 150 (e.g., Dest), the BSM result (e.g., . . . ), and an identifier of the EP 115-a used to generate the BSM result (e.g., 1).

The network node 110-a may receive the command and recover the quantum state of the source particle 145 based on the command. For example, the network node 110-a may identify one of the EPs 115-b associated with the BSM indicated within the command based on the identifier of the EP 115-a within the command. The network node 110-a may perform a QSR operation to determine the quantum state of the source particle 145 based on the identified EP 115-b and the BSM. Because the identified EP 115-b and the EP 115-a used to generate the BSM are from a same pair of EPs (e.g., EPs 115-a and 115-b may be measured to have opposite spins), the network node 110-a may determine the quantum state of the source particle 145 based on performing the QSR operation using the identified EP 115-b and the BSM result.

The network node 110-a may reference a forwarding table (e.g., stored at the network node 110-a) to determine to which network node 110 to forward the command Here, the network node 110-a is in communication with three network nodes (e.g., the source network node 105, network node 110-b, and network node 110-c), but in other examples, the network node 110-a may be coupled with more network nodes 110 or less network nodes 110. The forwarding table may indicate either network node 110-b or network node 110-c based on the destination network node 150. For example, the forwarding table may indicate a network node 110 to minimize a number of hops (e.g., a number of network nodes the command is forwarded between prior to being forwarded to the destination network node), to maximize a reliability of the transmission (e.g., based on a reliability of the digital information channels 120 or the quantum entangled channels 125), or some other predetermined factor. An example forwarding table is shown below in table 1. The 'Node' may indicate a current node (e.g., here, network node 110-a), the 'Destination' may correspond to an Internet protocol address of the destination network node 150, the 'Forwarding Interface' may indicate a next network node 110, and the 'Link Metric' may indicate a rank of the corresponding interface. For example, a lower link metric value may correspond to a more favorable forwarding interface.

TABLE 1

Forwarding Table

| Node | Destination | Forwarding Interface | Link Metric |
|---|---|---|---|
| Source Network Node 105 | 192.168.0.0/16 | Network Node 110-a | 1 |
| Network Node 110-a | 192.168.0.0/16 | Network Node 110-b | 10 |
| Network Node 110-a | 192.168.0.0/16 | Network Node 110-c | 1 |
| Network Node 110-b | 192.168.0.0/16 | Network Node 110-d | 1 |
| Network Node 110-c | 192.168.0.0/16 | Network Node 110-d | 1 |
| Network Node 110-d | 192.168.0.0/16 | Destination Network Node 150 | 1 |

In the example of the forwarding table shown by Table 1, network node 110-a may determine to forward the command to the network node 110-c. That is, the network node 110-a may reference the second and third entries of the forwarding table (e.g., corresponding to the 'Node' network node 110-a). Because the link metric for network node 110-b is higher than the link metric for network node 110-c (e.g., 10 versus 1), the network node 110-a may determine to forward the command to network node 110-c. Based on determining a next network node 110, the network node 110-a may select an EP 115 for a quantum entangled channel 125 to utilize.

Here, the network node 110-*a* may select one of the EPs 115-*d* establishing a quantum entangled channel 125-*c* between the network node 110-*a* and the network node 110-*c*.

To forward a command, the network node 110-*a* may perform a BSM operation based on the quantum state determined by the QSR operation (e.g., the quantum state of the source particle 145) and the selected EP 115-*d*. Thus, the network node 110-*a* may cause the source EP 115-*d* to collapse into a classical state (e.g., the EP 115-*d* may no longer be a quantum particle). The network node 110-*a* may transmit, by the digital information channel 120-*c*, the BSM result to network node 110-*c*. For example, the network node 110-*a* may forward the command to the network node 110-*c* by the digital information channel 120-*c* including the BSM result, an indication of the destination network node 150, and an identifier or the EP 115-*d* used to determine the BSM result. When the network node 110-*c* receives the command, the network node 110-*c* may perform similar operations (e.g., a QSR operation, referencing a forwarding table, a BSM operation, and forwarding the command to a network node 110) as the network node 110-*a*. Thus, the command may be forwarded from one network node 110 to another network node 110 until the network node 110-*c* receives and forwards the command to the destination network node 150.

The destination network node 150 may receive the command by the digital information channel 120-*f* and identify one of the quantum entangled channels 125-*f* associated with the command based on an EP identifier within the command. The destination network node 150 may perform a QSR operation (e.g., based on the BSM result and one of the EPs 115-1 associated with the quantum entangled channels 125-*f*) to recover the quantum state of the source particle 145 with the destination particle 155. Thus, the system 100 of network nodes 105, 110, and 150 may enable a communication of the quantum state of the source particle 145 from a source network node 105 and a destination network node 150.

Figure 2:
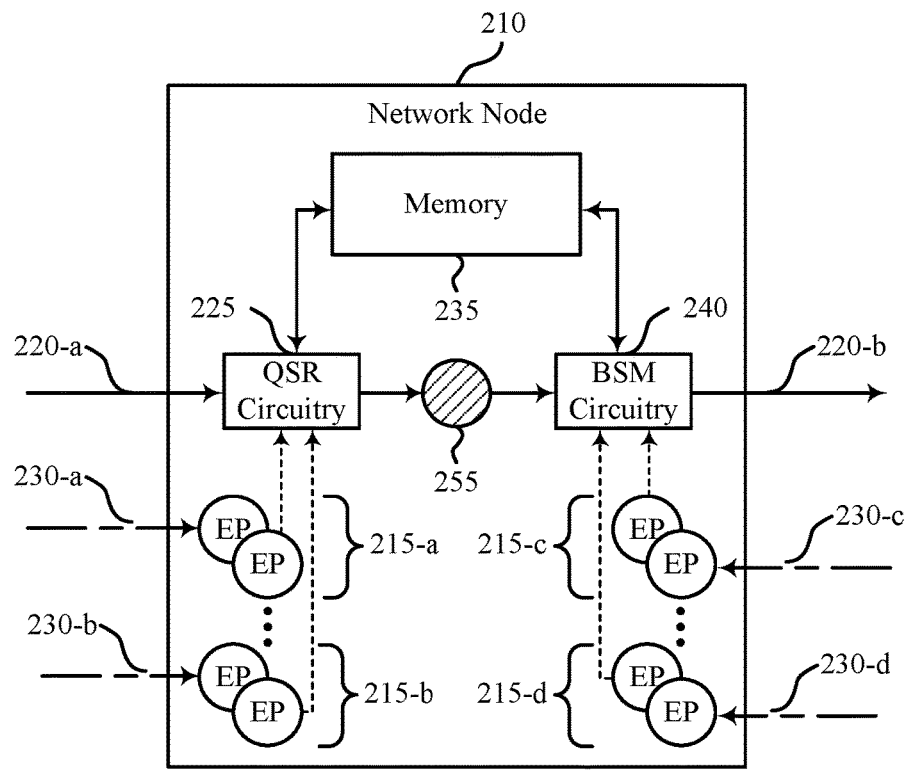
FIG. 2 illustrates an example of a configuration of a network node that supports a quantum Internet router in accordance with aspects of the present disclosure.

FIG. 2 illustrates an example of a configuration 200 of a network node 210 that supports a quantum Internet router in accordance with various aspects of the present disclosure. The network node 210 may include interfaces for a set of digital information channels 220. The network node 210 may also include EPs 215 establishing a set of quantum entangled channels. The network node 210 may include QSR circuitry 225, memory 235, and BSM circuitry 240. The configuration 200 may include aspects of the system 100 as described with reference to FIG. 1. For example, the network node 210 may be an example of a source network node 105, a network node 110, or a destination network node 150; the digital information channels 220 may be examples of the digital information channels 120; and the EPs 215 may be examples of the EPs 115 as described with reference to FIG. 1.

The network node 210 may receive EPs 215 for establishing quantum entangled channels between the network node 210 and other network nodes. The network node 210 may receive EP transmissions 230 from a control node (e.g., as described with reference to FIG. 1). The EP transmissions 230 may include an EP 215 and an identifier indicating a pair of EPs 215 and the associated quantum entangled channel between the network node 210 and another network node. For example, each of the EPs 215-*a* may be associated with a pair of EPs forming a quantum entangled channel between the network node 210 and another network node (e.g., a same network node). That is, there may be multiple quantum entangled channels between the network node 210 and the other network node each associated with one of the EPs 215. Here, the network node 210 may receive the EPs 215-*a* from a control node with an associated identifier indicating that the EPs 215-*a* are one of a pair of EPs for a quantum entangled channel between the network node 210 and the other network node. In the example of network node 210, there are four quantum entangled channel interfaces associated with the EPs 215-*a*, 215-*b*, 215-*c*, and 215-*d*.

The network node 210 may include digital information channel interfaces for receiving or transmitting information (e.g., commands) by the digital information channels 220. The network node 210 may have a digital information channel interface associated with each of the sets of EPs 215 (e.g., 215-*a*, 215-*b*, 215-*c*, and 215-*d*). That is, the network node 210 may be configured with four digital channel interfaces for communicating with four different nodes by digital information channels 220.

The network node 210 may receive commands by a digital information channel 220-*a*. The command may include a BSM result, an EP pair identifier, and an indication of a destination network node. The network node 210 may identify one of the EPs 215 associated with the command based on an identifier within the command. For example, the network node 210 may identify one of the EPs 215-*b* based on the identifier within the command. The QSR circuitry 225 of the network node 210 may receive the command and the EP 215 indicated by the identifier within the command (e.g., one of the EPs 215-*b*). Based on the BSM within the command and the received EP 215, the QSR circuitry 225 may output a quantum particle 255 with a same quantum state as a source particle (e.g., as described with reference to FIG. 1).

The network node 210 may reference a forwarding table stored within the memory 235 to determine to which network node to forward the command Here, the network node 210 may be in communication with four network nodes (e.g., associated with each of the sets of EPs 215), but in other examples, the network node 210 may be coupled with more network nodes or less network nodes. The forwarding table may indicate a network node associated with one of the sets of EPs 215 based on a destination network node indicated within the command. For example, the forwarding table may indicate a network node associated with one of EPs 215-*c*. Based on the network node indicated by the forwarding table, the BSM circuitry 240 may perform a BSM operation to generate a BSM result. The BSM circuitry 240 may perform the BSM operation based on the quantum particle 255 and one of the EPs 215 associated with a quantum entangled channel between the network node 210 and a network node indicated by the forwarding table. The network node 210 may forward a command by the digital information channel 220-*b* to the indicated network node, where the command includes the BSM result calculated by the BSM circuitry 240, an identifier of the EP pair used for the BSM operation, and the indication of the destination network node.

Figure 3:
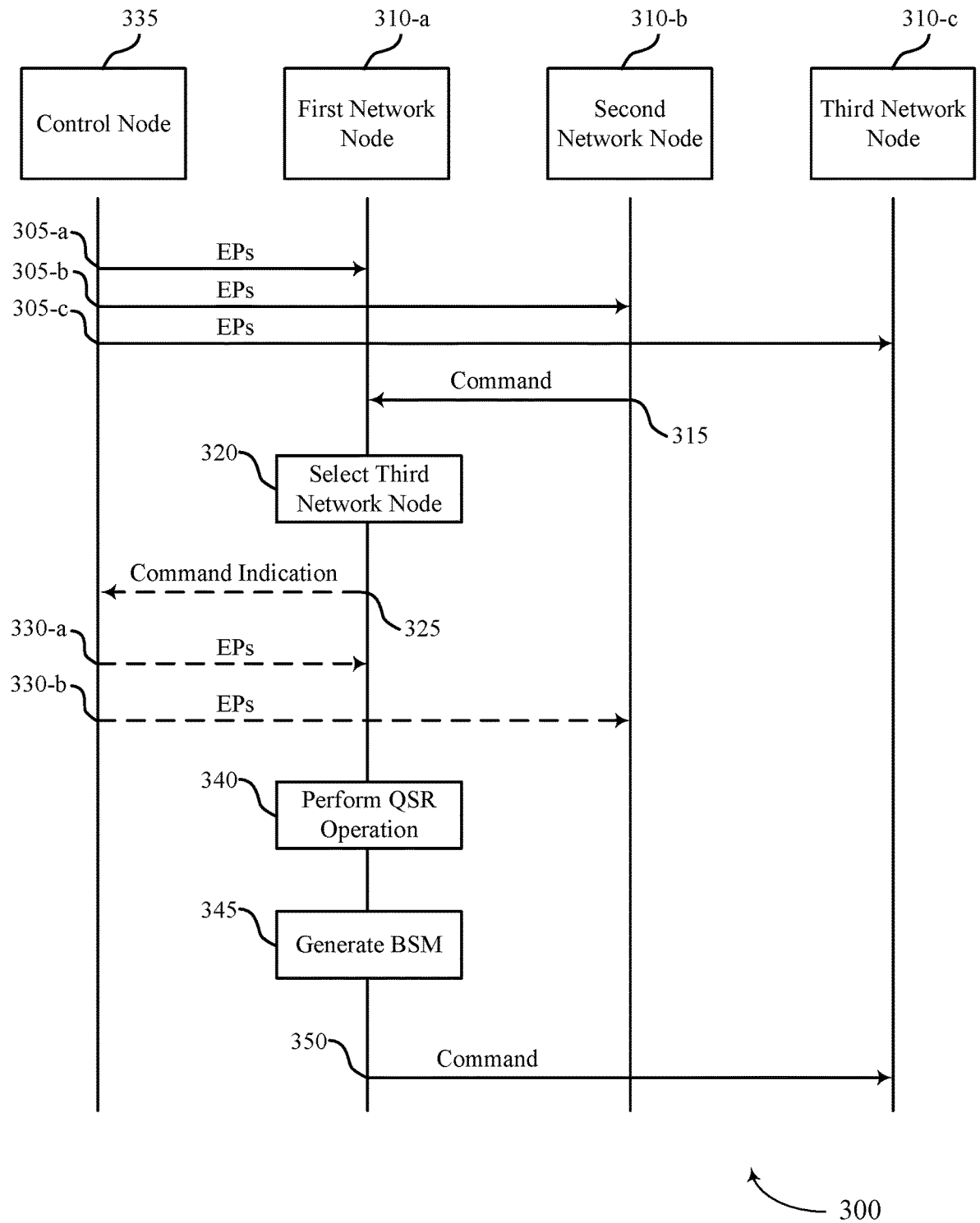
FIG. 3 illustrates an example of a process flow that supports a quantum Internet router in accordance with aspects of the present disclosure.

FIG. 3 illustrates an example of a process flow 300 that supports a quantum Internet router in accordance with various aspects of the present disclosure. The process flow 300 may include operations performed by a control node 335, a first network node 310-*a*, a second network node 310-*b*, and a third network node 310-*c*. The control node 335 and network nodes 310 may be examples of a control node and network nodes as described with reference to FIGS. 1 and 2. Each of the network nodes 310 may be configured to communicate quantum state information (e.g., qubits) from a source network node to a destination network node.

At 305, the control node 335 may transmit EPs to each of the network nodes 310. The control node may create multiple pairs of EPs and transmit one EP within a pair of EPs to a first network node 310 and the second EP within the pair of EPs to a second network node 310, thus establishing a quantum entangled channel between the two network nodes. Thus, at 305-*a*, the first network node 310-*a* may receive, from the control node 335, more than one EP each associated with a pair of EPs that establish a quantum entangled channel between the first network node 310-*a* and the second network node 310-*b*. The more than one EP may also include EPs that establish one or more quantum entangled channels between the first network node 310-*a* and the third network node 310-*c*. At 305-*a*, the first network node 310-*a* may additionally receive a set of identifiers identifying the pairs of EPs. At 305-*b* and 305-*c*, the second network node 310-*b* and 310-*c* may also receive more than one EP associated with pairs of EPs for establishing a quantum entangled channel with another network node 310.

At 315, the second network node 310-*b* may transmit a command to the first network node 310-*a*. The command may be transmitted by a digital information channel (e.g., a first digital information channel) and may indicate a destination network node, a BSM associated with a first EP of a pair of EPs establishing a quantum entangled channel between the first network node 310-*a* and the second network node 310-*b*. The command may additionally include an identifier of the first pair of EPs.

At 320, the first network node 310-*a* may select, based on the destination network node, a third network node 310-*c*. In some cases, selecting the third network node 310-*c* may include the first network node 310-*a* referencing a forwarding table, where the forwarding table indicates the third network node 310-*c* based on the destination network node.

At 325, the first network node 310-*a* may optionally transmit an indication of the command (e.g., received at 315) to the control node 335. In some cases, receiving the command at 315 may decrease a quantity of quantum entangled channels between the first network node 310-*a* and the second network node 310-*b*. Here, the first network node 310-*a* may transmit the indication of the command based on the quantity of quantum entangled channels between the first network node 310-*a* and the second network node 310-*b* being less than a threshold quantity of quantum entangled channels.

In response to the indication received at 325, at 330, the control node 335 may optionally create one or more pairs of EPs and transmit one of the EPs of the pair of EPs to the first network node 310-*a* (e.g., at 330-*a*) and the second network node 310-*b* (e.g., at 330-*b*).

At 340, the first network node 310-*a* may perform a QSR operation based on the BSM measurement (e.g., indicated within the command received at 315). The first network node 310-*a* may perform the QSR operation to determine a quantum state of a source particle associated with the command received at 315.

At 345, the first network node 310-*a* may generate a second BSM result based on the first BSM result (e.g., included within the command received at 315) and a second EP of a second pair of EPs that establishes a quantum entangled channel between the first network node 310-*a* and the third network node 310-*c*. In some cases, the second BSM result may further be based on the quantum state of the source particle determined based on the QSR operation performed at 340.

At 350, the first network node 310-*a* may transmit the command by a digital information channel to the third network node 310-*b*. The second command may indicate the destination network node and the second BSM result generated at 345. Additionally, the second command may indicate an identifier of the second pair of EPs that establish the quantum entangled channel between the first network node 310-*a* and the third network node 310-*c*.

Figure 4:
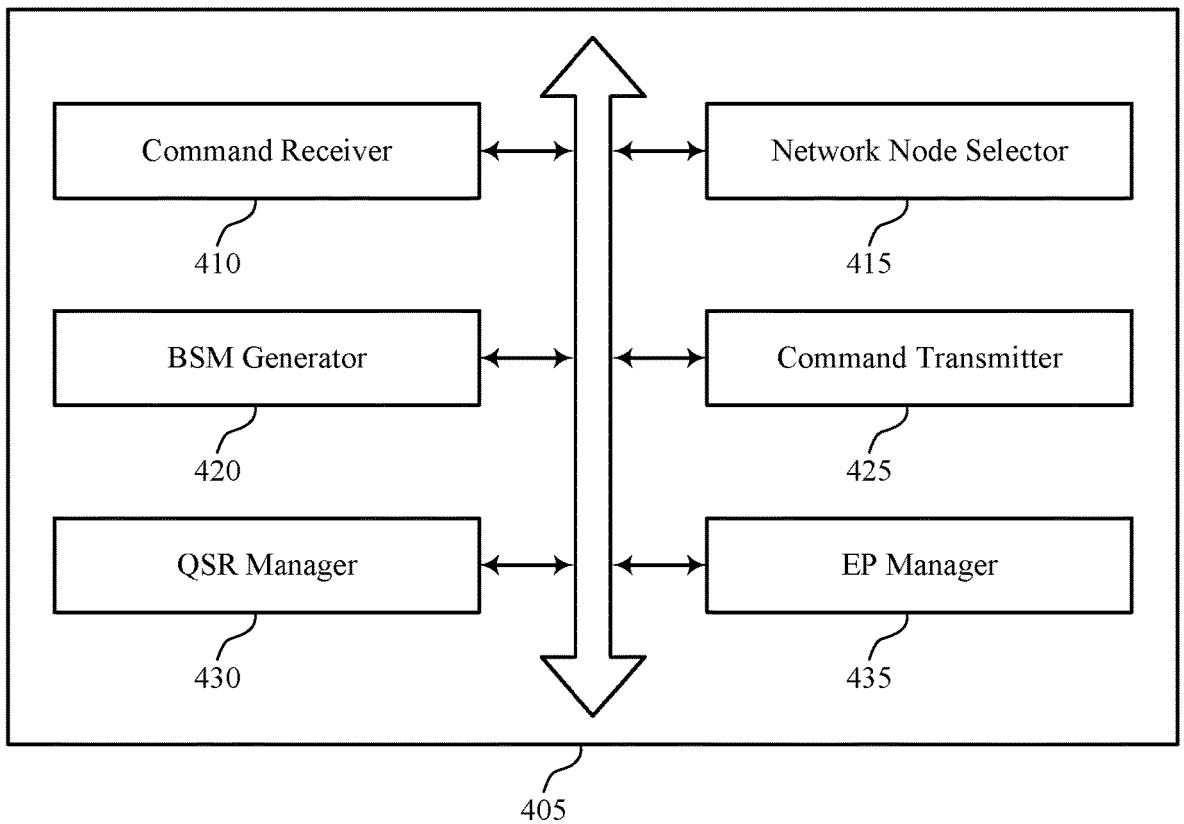
FIG. 4 shows a block diagram of a network node that supports a quantum Internet router in accordance with aspects of the present disclosure.

FIG. 4 shows a block diagram 400 of a network node 405 that supports a quantum Internet router in accordance with aspects of the present disclosure. The network node 405 may be an example of aspects of network node as described with reference to FIGS. 1 through 3. The network node 405 may include a command receiver 410, a network node selector 415, a BSM generator 420, a command transmitter 425, a QSR manager 430, and an EP manager 435. Each of these modules may communicate, directly or indirectly, with one another (e.g., via one or more buses).

The command receiver 410 may receive, from a second network node via a first digital information channel, a first command indicating a destination network node and a first BSM associated with a first EP of a first pair of EPs that establish a first quantum entangled channel between the first network node and the second network node. In some cases, the first network node is different than the destination network node. In some examples, the command receiver 410 may receive, from a fourth network node of the set of network nodes different than the second network node, a third command indicating a second destination network node and a third BSM associated with a third pair of EPs of the one or more pairs of EPs that establish a third quantum entangled channel between the first network node and the fourth network node.

The network node selector 415 may select, based on the destination network node, a third network node from a set of network nodes, where the first network node includes one or more EPs each associated with respective ones of one or more pairs of EPs that establish respective quantum entangled channels between the first network node and each network node of the set of network nodes. In some examples, the network node selector 415 may select the third network node is based on the first network node being different than the destination network node. In some cases, the selecting the third network node further includes referencing a forwarding table, where the forwarding table indicates the third network node based on the destination network node.

The BSM generator 420 may generate a second BSM based on the first BSM and the first EP and associated with a second EP of a second pair of EPs of the one or more pairs of EPs that establishes a second quantum entangled channel between the first network node and the third network node.

The command transmitter 425 may transmit, to the third network node by a second digital information channel, a second command indicating the destination network node and the second BSM. In some cases, the second command further indicates an identifier of the second pair of EPs.

The QSR manager 430 may perform, based on the first BSM and the first pair of EPs, a QSR operation to determine a quantum state of a source particle associated with the first command, where generating the second BSM is based on the quantum state of the source particle associated with the first command.

The EP manager 435 may receive, from a control node, more than one EP each associated with a respective pair of EPs that establishes a quantum entangled channel between the first network node and the second network node, where the more than one EP includes the first EP. In some instances, the EP manager 435 may additionally receive, from the control node, a set of identifiers identifying the respective pairs of EPs, where the first command further includes a first identifier of the set of identifiers identifying the first pair of EPs. In some examples, the EP manager 435 may transmit, to a control node, an indication of receiving the first command indicating the first BSM associated with the first pair of EPs that establish the first quantum entangled channel between the first network node and the second network node. In some instances, the EP manager 435 may receive, from the control node, a third EP associated with a third pair of EPs that establishes a third entangled channel between the first network node and the second network node. In some examples, receiving the first command indicating the first BSM associated with the first pair of EPs that establish the first quantum entangled channel between the first network node and the second network node decreases a quantity of quantum entangled channels between the first network node and the second network node by one. The EP manager 435 may transmit the indication is based on the quantity of quantum entangled channels between the first network node and the second network node being less than a threshold quantity of entangled channels between the first network node and the second network node based on decreasing the quantity of quantum entangled channels between the first network node and the second network node by one.

Figure 5:
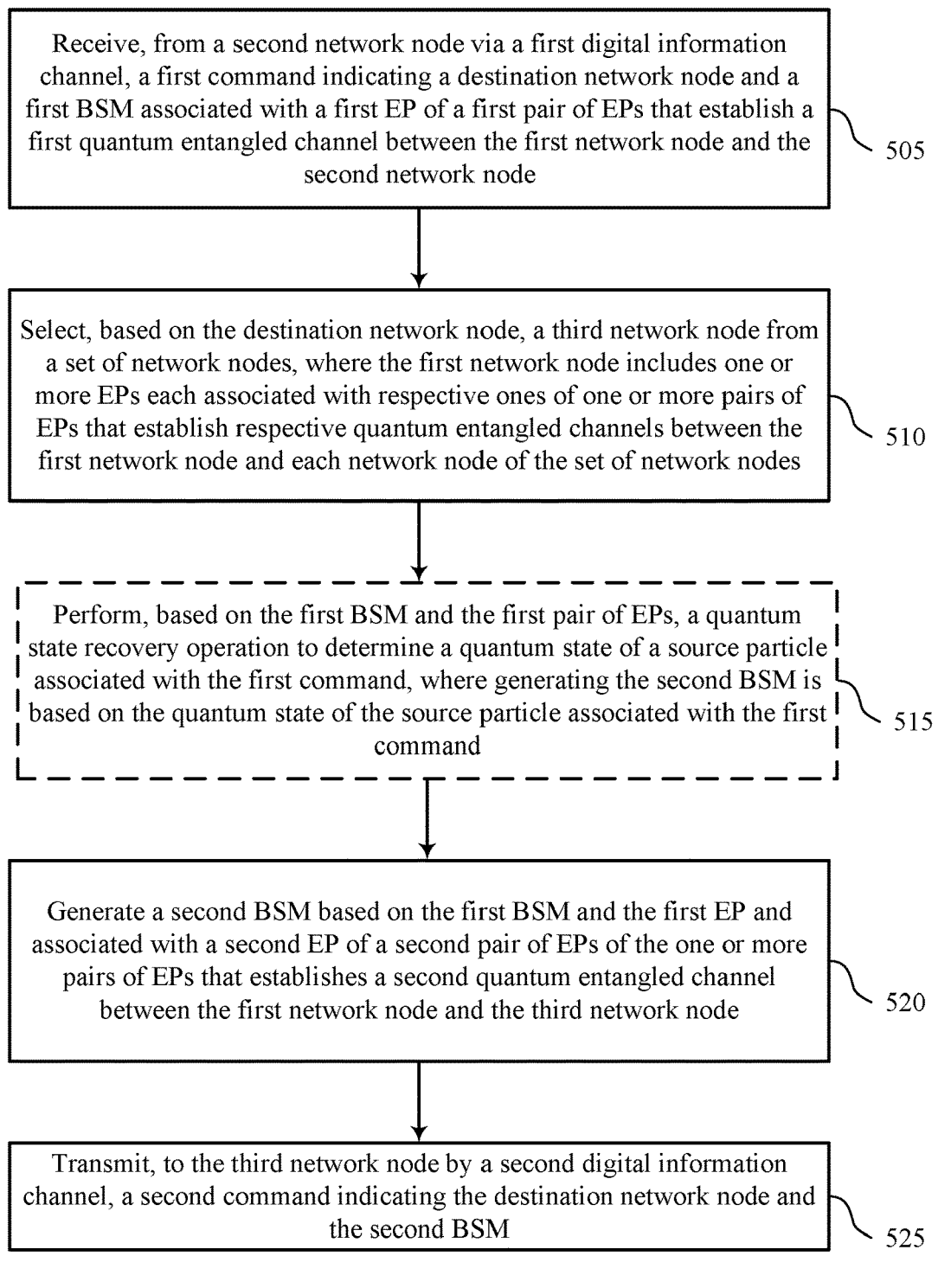
FIG. 5 shows a flowchart illustrating a method that supports quantum Internet router in accordance with aspects of the present disclosure.

FIG. 5 shows a flowchart illustrating a method 500 that supports a quantum Internet router in accordance with aspects of the present disclosure. The operations of method 500 may be implemented by a first network node or its components as described herein. For example, the operations of method 500 may be performed by a network node as described with reference to FIGS. 1 through 4. Additionally or alternatively, the operations of method 500 may be performed by the memory within the network node, the BSM circuitry, or the QSR circuitry within the network node as described with reference to FIG. 2. In some examples, a first network node may execute a set of instructions to control the functional elements of the first network node to perform the described functions. Additionally or alternatively, a first network node may perform aspects of the described functions using special-purpose hardware.

At 505, the first network node may receive, from a second network node via a first digital information channel, a first command indicating a destination network node and a first BSM associated with a first EP of a first pair of EPs that establish a first quantum entangled channel between the first network node and the second network node. The operations of 505 may be performed according to the methods described herein. In some examples, aspects of the operations of 505 may be performed by a command receiver as described with reference to FIG. 4.

At 510, the first network node may select, based on the destination network node, a third network node from a set of network nodes, where the first network node includes one or more EPs each associated with respective ones of one or more pairs of EPs that establish respective quantum entangled channels between the first network node and each network node of the set of network nodes. The operations of 510 may be performed according to the methods described herein. In some examples, aspects of the operations of 510 may be performed by a network node selector as described with reference to FIG. 4.

At 515, the first network node may perform, based on the first BSM and the first pair of EPs, a QSR operation to determine a quantum state of a source particle associated with the first command, where generating the second BSM is based on the quantum state of the source particle associated with the first command. The operations of 515 may be performed according to the methods described herein. In some examples, aspects of the operations of 515 may be performed by a QSR manager as described with reference to FIG. 4.

At 520, the first network node may generate a second BSM based on the first BSM and the first EP and associated with a second EP of a second pair of EPs of the one or more pairs of EPs that establishes a second quantum entangled channel between the first network node and the third network node. The operations of 515 may be performed according to the methods described herein. In some examples, aspects of the operations of 515 may be performed by a BSM generator as described with reference to FIG. 4.

At 525, the first network node may transmit, to the third network node by a second digital information channel, a second command indicating the destination network node and the second BSM. The operations of 520 may be performed according to the methods described herein. In some examples, aspects of the operations of 520 may be performed by a command transmitter as described with reference to FIG. 4.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed at a first network node, comprising:

receiving, from a second network node via a first digital information channel, a first command indicating a destination network node and a first result of a first Bell-state measurement performed at the second network node with (i) a source particle and (ii) a first entangled particle of a first pair of entangled particles that establish a first quantum entangled channel between the first and second network nodes;

selecting, based at least in part on the destination network node, a third network node from a set of network nodes; and when a number of quantum entangled channels between the first and third network nodes is greater than a threshold:

performing, based at least on the first result of the first Bell-state measurement, a second Bell-state measurement with (i) a second entangled particle of the first pair of entangled particles and (ii) a third entangled particle of a second pair of entangled particles that establish one of the quantum entangled channels between the first and third network nodes; and transmitting, to the third network-node via a second digital information channel, a second command indicating the destination network node and a second result of the second Bell-state measurement.

2. The method of claim 1, further comprising performing, based at least in part on the first result of the first Bell-state measurement quantum-state recovery to transform a quantum state of the second entangled particle into a quantum state of the source particle.

3. The method of claim 1, further comprising receiving the second entangled particle from a control node.

4. The method of claim 3,
further comprising receiving, from the control node, an identifier that uniquely identifies the first pair of entangled particles from a plurality of pairs of entangled particles;
wherein the first command further comprises the identifier.

5. The method of claim 1, further comprising:
sending, when the number of quantum entangled channels between the first and third network nodes is less than or equal to the threshold, a message to a control node indicating that the number of quantum entangled channels between the first and third network nodes is less than or equal to the threshold; and
receiving, from the control node and in response to said sending, one additional entangled particle of each of one or more additional pairs of entangled particles that establish one or more additional quantum entangled channels between the first and third network nodes.

6. The method of claim 5, the threshold being zero.

7. The method of claim 1, wherein said selecting includes referencing a forwarding table, that indicates the third network node.

8. The method of claim 1, further comprising receiving the third entangled particle from a control node.

9. The method of claim 8,
further comprising receiving, from the control node, an identifier that uniquely identifies the second pair of entangled particles from a plurality of pairs of entangled particles;
wherein the second command further comprises the identifier.

10. The method of claim 1, the threshold being zero.

11. A first network node, comprising:
a processor;
a memory communicably coupled with the processor, the memory storing machine-readable instructions that, when executed by the processor, control the first network node to:
receive, from a second network node via a first digital information channel, a first command indicating a destination network node and a first result of a first Bell-state measurement performed at the second network node with (i) a source particle and (ii) a first entangled particle of a first pair of entangled particles that establish a first quantum entangled channel between the first and second network nodes;
select, based at least in part on the destination network-node, a third network node from a set of network nodes; and
when a number of quantum entangled channels between the first and third nodes is greater than a threshold:
perform, based on at least the first result of the first Bell-state measurement, a second Bell-state measurement with (i) a second entangled particle of the first pair of entangle particles and (ii) a third entangled particle of a second pair of entangled particles, and
transmit, to the third network node via a second digital information channel, a second command indicating the destination network node and a second result of the second Bell-state measurement.

12. The first network node of claim 11, the memory storing additional machine-readable instructions that, when executed by the processor, control the first network node to perform, based at least in part on the first result of the first Bell-state measurement, quantum state recovery that transforms a quantum state of the second entangled particle into a quantum state of the source particle.

13. The first network node of claim 12, the memory storing additional machine-readable instructions that, when executed by the processor, control the first network node to receive the second entangled particle from a control node.

14. The first network node of claim 13, wherein:
the memory stores additional machine-readable instructions that, when executed by the processor, control the first network node to receive, from the control node, an identifier that uniquely identifies the first pair of entangled particles from a plurality of pairs of entangled particles; and
the first command further comprises the identifier.

15. The first network node of claim 11, the memory storing additional machine-readable instructions that, when executed by the processor, control the first network node to:
send, when the number of quantum entangled channels between the first and third network nodes is less than or equal to the threshold, a message to a control node indicating that the number of quantum entangled channels between the first and third network nodes is less than or equal to the threshold, and
receive, from the control node and in response to said sending, one additional entangled particle of each of one or more additional pairs of entangled particles that establish one or more additional quantum entangled channels between the first and third network nodes.

16. The first network node of claim 15, the threshold being zero.

17. The first network node of claim 11, wherein the machine-readable instructions that, when executed by the processor, control the first network node to select include machine-readable instructions that, when executed by the processor, control the first network node to reference a forwarding table that indicates the third network node.

18. The first network node of claim 11, the memory storing additional machine-readable instructions that, when executed by the processor, control the first network node to receive the third entangled particle from a control node.

19. The first network node of claim 18, wherein:
the memory stores additional machine-readable instructions that, when executed by the processor, control the node to receive, from the control node, an identifier that uniquely identifies the second pair of entangled particles from a plurality of pairs of entangled particles; and
the second command further comprises the identifier.

20. The first network node of claim 11, the threshold being zero.

* * * * *